United States Patent
Moon et al.

(10) Patent No.: US 10,870,256 B2
(45) Date of Patent: Dec. 22, 2020

(54) HYDROPHILIC ALUMINUM SURFACE BODY HAVING HYBRID NANOSTRUCTURE AND MANUFACTURING METHOD THEREOF

(71) Applicant: KOREA INSTITUTE OF SCIENCE AND TECHNOLOGY, Seoul (KR)

(72) Inventors: Myoung Woon Moon, Seoul (KR); Sun Mi Yoon, Seoul (KR); Kwang Ryeol Lee, Seoul (KR); Hye Bin Lee, Seoul (KR); Young A Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 52 days.

(21) Appl. No.: 16/184,956

(22) Filed: Nov. 8, 2018

(65) Prior Publication Data
US 2019/0202166 A1    Jul. 4, 2019

(30) Foreign Application Priority Data
Dec. 29, 2017 (KR) .......... 10-2017-0184625

(51) Int. Cl.
*B32B 5/16* (2006.01)
*B32B 15/16* (2006.01)
*B32B 15/20* (2006.01)
*C23C 22/05* (2006.01)
*C23C 22/73* (2006.01)

(52) U.S. Cl.
CPC .......... *B32B 5/16* (2013.01); *B32B 15/16* (2013.01); *B32B 15/20* (2013.01); *C23C 22/05* (2013.01); *C23C 22/73* (2013.01); *B32B 2264/102* (2013.01); *B32B 2307/728* (2013.01)

(58) Field of Classification Search
CPC .................. B32B 5/16; B32B 15/16
See application file for complete search history.

(56) References Cited

U.S. PATENT DOCUMENTS

2014/0272291 A1* 9/2014 Moon ............. C23C 22/68
428/141

OTHER PUBLICATIONS

J. Theo Kloprogge et al., "XPS study of the major minerals in bauxite: Gibbsite, bayerite and (pseudo-)boehmite," Journal of Colloid and Interface Science, Oct. 17, 2005, pp. 572-576, Elsevier Inc.

* cited by examiner

*Primary Examiner* — Alexandre F Ferre
(74) *Attorney, Agent, or Firm* — Cantor Colburn LLP

(57) ABSTRACT

Provided are a hydrophilic aluminum surface body having a hybrid nanostructure and a manufacturing method thereof. The hydrophilic aluminum surface body includes an aluminum substrate; and a nanopattern including a hybrid nanostructure formed on a surface of the aluminum substrate, wherein the hybrid nanostructure includes nanoparticles and a plurality of nanoflakes around the nanoparticles. According to the manufacturing method of the hydrophilic aluminum surface body, hydrophobic aluminum may be artificially prepared as hydrophilic or superhydrophilic aluminum due to a small contact angle, and large-area and mass production is possible and the method is eco-friendly.

18 Claims, 11 Drawing Sheets

HYDROPHILIC ALUMINUM SURFACE BODY HAVING HYBRID NANOSTRUCTURE AND MANUFACTURING METHOD THEREOF

CROSS-REFERENCE TO RELATED APPLICATION

This application claims the benefit of Korean Patent Application No. 10-2017-0184625, filed on Dec. 29, 2017, in the Korean Intellectual Property Office, the disclosure of which is incorporated herein in its entirety by reference.

BACKGROUND

1. Field

One or more embodiments relate to a hydrophilic aluminum surface body having a hybrid nanostructure and a manufacturing method thereof, and more particularly, to a method of artificially manufacturing a hydrophilic or superhydrophilic aluminum surface having a small contact angle of a fluid such as deionized water as well as significantly low wettability to aluminum used in a heat exchange tube, a fin, and the like.

2. Description of the Related Art

Development of a material used for dehumidification to remove moisture in the air in a high humidity and high temperature environment is a very important study for energy reduction and improvement of dehumidification ability. Specifically, moisture at industrial sites as well as at home is the most important factor that causes failure to parts and equipment. However, a current dehumidification system uses freon gas causing an environmental hazard or an adsorbent required for a high temperature heating, thereby raising the product cost and polluting the environment.

In order to reduce the energy consumption and improve the dehumidification efficiency, it is important that the surface of the material such as aluminum, which is the material used for the surface of a dehumidifier or a heat exchanger, has a hydrophilic property capable of adhering moisture well. In addition, the development of surface materials with continuous durability against a hydrophilic property of the material has been emphasized.

Hydrophilic or superhydrophilic surfaces with good affinity to purified water may be used for water harvesting, anti-fog, anti-bacteria or growing cells, or have been continuously studied to improve the bonding properties with other materials by modifying the characteristics of the material surface.

As a method of forming such hydrophilic or superhydrophilic surfaces on the surface of the material, wet etching, UV treatment, plasma/ion treatment, or the like is used. Particularly, it is known that a hydrophilic or super hydrophilic surface may be obtained by increasing the roughness of the surface and controlling a surface chemical property by using a material having a hydrophilic property.

Attempts have been made to realize such hydrophilic properties on various materials and thin film surfaces, but there is a disadvantage that surface hydrophilic properties are easily removed. This is because the surface energy of the hydrophilic surface is relatively high, so that the hydrophilic surface tends to be easily bonded to fine particles such as water molecules or hydrocarbons in the air in order to lower the surface energy, and when this bond is made, the surface energy is lowered and hydrophilicity is lost. Therefore, most of the hydrophilic or superhydrophilic treatment by methods known in the related art is not effective within a few hours or several days, and thus various studies have been made to maintain the hydrophilic or superhydrophilic properties for a long time.

The surface treated with oxygen or nitrogen plasma is known to show an aging effect due to the property that the hydrophilicity is increased, but the surface is thermodynamically unstable and tends to return to the hydrophobicity. Techniques for preventing the aging effect may be used for coating techniques for suppressing fogging of bath mirror, cold winter glasses, automobile glass and the like, as well as application to fields requiring application to the living body. In addition, the surface may be applied to a technique for increasing the heat transfer efficiency of the surface of an evaporator of a refrigerator or various fields such as a heat exchanger fin for controlling the humidity such as the surface of the dehumidifier of the air conditioner. In addition, when the surface is applied to an inner pipe of a pipe, it is possible to apply a special sanitary pipe or the like, which suppresses bacterial growth and reduces flow resistance.

In the case of a heat exchanger (evaporator) in a refrigerator or an air conditioning system, the performance or efficiency of the system is proportional to the heat transfer area of the heat exchanger. As a result, various types of fins are attached to increase the heat transfer area. In the refrigeration or dehumidification system, the most problem of lowering the performance and efficiency is the dew condensation (frost) on the surface of the evaporator, and droplets generated by condensation are frozen to reduce the heat exchange area or the droplets between the fins are entangled to prevent an air-side flow path, thereby reducing the heat exchange flow rate and increasing the blower load. In addition, the heat exchange is not smooth, and the air-side flow path is blocked due to the continuous dew condensation on the outer surface of the evaporator to cause failures such as the blower overload, and in the worst case, the system is stopped.

Accordingly, there has been a problem in that system efficiency is deteriorated due to an additional energy supply such as defrosting by supplying additional heat from the outside, or defrosting by heating the evaporator by periodically reverse-circulating a refrigerant. As a result, a solution has been studied in which the outer surface of the evaporator is treated with a hydrophilic property to suppress the formation of droplets on the surface of the heat exchanger, and a uniform thin film is always formed to maintain constant heat exchange performance. As the same principle as the above refrigerator or air conditioner, even in the evaporator, which is included in the dehumidifier without using a liquid dehumidifying solution and condenses on the surface of the dehumidifier to collect moisture, when the surface of the evaporator is treated as a hydrophilic property, the performance and the efficiency of the dehumidifier are enhanced.

However, the durability problem of the hydrophilic surface treatment has always been on the rise, and a hydrophilic surface treatment technique, which is environmentally friendly and low in processing cost, has been required.

SUMMARY

One or more embodiments provide an aluminum surface body with improved hydrophilicity and improved durability of hydrophilicity.

One or more embodiments provide a manufacturing method of the aluminum surface body.

Additional aspects will be set forth in part in the description which follows and, in part, will be apparent from the description, or may be learned by practice of the presented embodiments.

According to one or more embodiments, a hydrophilic aluminum surface body includes: an aluminum substrate; and a nanopattern including a hybrid nanostructure formed on the surface of the aluminum substrate, wherein the hybrid nanostructure includes nanoparticles and a plurality of nanoflakes around the nanoparticles.

According to one or more embodiments, a manufacturing method of a hydrophilic aluminum surface body includes: preparing a hydrophilic aluminum surface by oxidizing nanoparticles and an aluminum substrate to form a hybrid nanostructure including nanoparticles on a part or the whole of the surface of the aluminum substrate and a plurality of nanoflakes around the nanoparticles.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
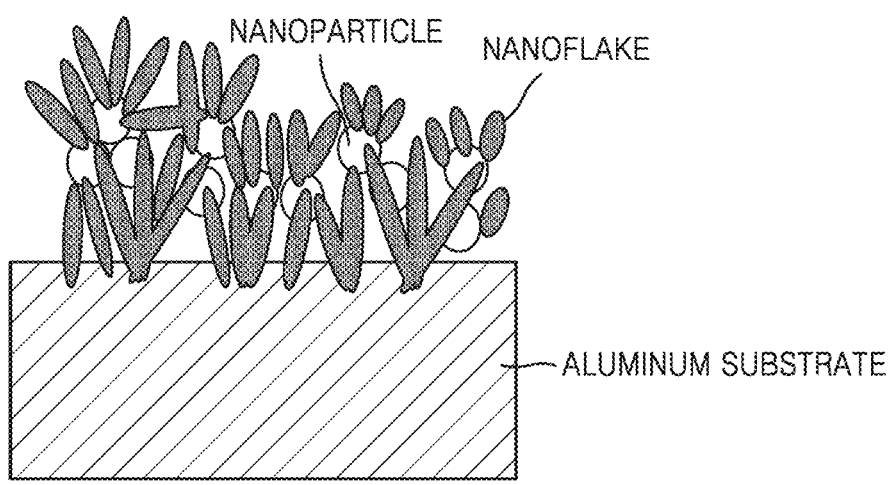
FIGS. 1A and 1B are schematic views of a hydrophilic aluminum surface body according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Meanwhile, the terminology used in the following description is used only to describe specific embodiments and is not intended to limit the present disclosure. An expression in the singular includes an expression in the plural unless the content clearly indicates otherwise. In the following description, it should be understood that terms, such as "include" and "have", are used to indicate the presence of stated features, numbers, steps, operations, elements, parts, components, materials, or a combination thereof described in the specification without excluding in advance the possibility of the presence or addition of one or more other features, numbers, steps, operations, elements, parts, components, materials, or combinations thereof.

Hereinafter, a hydrophilic aluminum surface body according to an embodiment and a manufacturing method thereof will be described in detail with reference to the accompanying drawings.

Figure 1B:
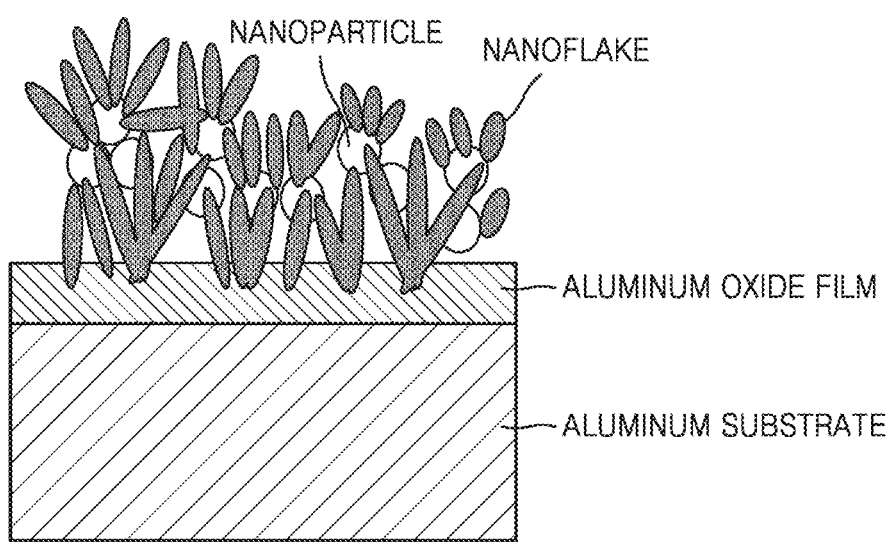

FIGS. 1A and 1B are schematic views of a hydrophilic aluminum surface body according to an embodiment.

As shown in FIG. 1A, a hydrophilic aluminum surface body according to one embodiment includes: an aluminum substrate; and a nanopattern including a hybrid nanostructure formed on the surface of the aluminum substrate, wherein the hybrid nanostructure includes nanoparticles and a plurality of nanoflakes around the nanoparticles.

The hydrophilic aluminum surface body is formed with a nanopattern of a hybrid nanostructure including nanoparticles and nanoflakes on a part or the whole of the surface of the aluminum substrate and has a small contact angle with purified water (water), and the small contact angle may have durability without affecting the aging effect.

The aluminum substrate means a substrate made of aluminum, regardless of its shape, thickness, and bonding with other materials, and is not limited to a material made of pure aluminum. The aluminum substrate may be in the form of a plate or mesh.

The aluminum substrate may further include an aluminum oxide film including boehmite (AlO(OH)), aluminum oxide ($Al_2O_3$) or a combination thereof on the surface of the aluminum substrate as shown in FIG. 1B. The aluminum oxide film may be formed in an oxidation process during the manufacturing.

The nanopattern formed on the surface of the aluminum substrate includes a hybrid nanostructure formed by hybridizing nanoparticles and nanoflakes, and the nanoflakes may have shapes of needles, plates, or combinations thereof. The hybrid nanostructure has a shape in which the nanoparticles are hybridized with the nanoflakes so that the nanoparticles are formed alone or in a cluster therein and the nanoflakes are formed on the outside of the nanoparticles.

The size of the nanoparticle may be several nm to several hundreds nm. For example, the nanoparticles may have an average diameter in the range of about 1 nm to about 1000 nm, for example, about 20 nm to about 600 nm, and about 50 nm to about 500 nm. In the range, while the nanoflakes are grown around the nanoparticles, a hybrid nanostructure having a shape capable of imparting hydrophilicity to the aluminum substrate may be obtained.

The nanoparticles sustain hydrophilicity of the aluminum surface body, and may serve as a nucleus that forms a central point in growing the nanoflakes through oxidation of the aluminum substrate and may form a hydrophilic aluminum substrate having a unique characteristic of the nanoparticles.

The nanoparticles are generally spherical in shape, but may be in the form of a plate or a tube, and may include at least one selected from the group consisting of metals, metal oxides, carbon nanotubes, and graphenes. The nanoparticles may include at least one selected from the group consisting of Ti, Au, Ag, Pt, Cr, Fe, Co, Ni, Cu, Al, Si, alloys thereof and oxides thereof. For example, $TiO_2$, $SiO_2$, Au, Pt, Ag, carbon nanotube, graphene, and the like may be used. Depending on the type of nanoparticles used, application fields may also be varied considering the functionality of the material.

The nanoparticles may be present singly or a plurality of nanoparticles may be aggregated to form a nanocluster, and the nanoparticles may be present in a combined form.

Each of the nanoflakes has a plate, needle or dot shape and may include boehmite (AlO(OH)), aluminum oxide ($Al_2O_3$) or a combination thereof. The nanoflakes are formed around the nanoparticles. For example, a plurality of nanoflakes may have a structure which is formed around the nanoparticles and on the aluminum substrate and grown toward the top of the surface of the aluminum substrate.

When each of the nanoflakes has a needle shape, the longitudinal direction thereof is substantially vertical to the surface of the aluminum substrate, one end in the longitudinal direction is chemically bonded to the surface of the aluminum substrate, and the other end forms the surface of the hydrophilic aluminum surface body to contact the air. Further, when each of the nanoflakes has a plate shape, one end in a height direction substantially vertical to the surface of the aluminum substrate is chemically bonded to aluminum and the other end has a structure which forms the surface of the hydrophilized aluminum surface body to contact the air, and the plate-shaped nanoflakes form a hybrid nanostructure having a leave or petal-like shape around the nanoparticles. The plate-like nanoflakes may have a sawtooth shape at the end portion in contact with air.

Each of the nanoflakes may have a height of about 10 nm to about 300 nm in the case of the needle shape and a height of about 10 nm to about 30 nm and a width of about 10 nm to about 300 nm in the case of the plate shape. In the range, the hybrid nanostructure for imparting hydrophilicity to the aluminum surface body may be formed.

When the nanopattern formed of the hybrid nanostructure including the nanoparticles and the nanoflakes is formed on the surface of the aluminum substrate, the hydrophobic aluminum surface may be changed to hydrophilic due to the fine nanopattern. In addition, the nanopattern is excellent in durability and chemically stable, so that hydrophilicity may be maintained for a long time.

The hydrophilic aluminum surface body may exhibit a hydrophilic property with a contact angle of 20° or less using purified water, and may exhibit a superhydrophilic property with a contact angle of 10° or less. Such hydrophilic to superhydrophilic properties are strong in persistence enough to maintain hydrophilic to superhydrophilic properties even though the hydrophilic aluminum surface body is exposed to the atmosphere for 60 days or more.

Since the hydrophilic aluminum surface body includes nanoparticles having persistent hydrophilicity and is hydrophilized by a technique for controlling the microstructure of the aluminum surface, the hydrophilic or superhydrophilic property may be maintained for a much longer time than simple coating or surface activation treatment. In addition, hydrophilicity may be imparted by a nanopattern including the hybrid nanostructure chemically bonded to the surface of aluminum. Such a nanopattern is stable in energy and the durability of the hydrophilic aluminum surface body is excellent.

Such a hydrophilic aluminum surface body may be effectively applied to an oil-water separating apparatus.

In addition, the hydrophilic aluminum surface body may be applied to various products depending on the functionality of the nanoparticles. The hydrophilic aluminum surface body may be applied to all or a part of components, and may be applied to, for example, industrial or household dehumidifiers; Sanitary piping; mirrors or glasses that are not glazed; and various heat exchangers such as air conditioners, refrigerators, freezers, and the like.

Hereinafter, a manufacturing method of a hydrophilic aluminum surface body according to one embodiment will be described.

The manufacturing method of a hydrophilic aluminum surface body according to one embodiment includes: preparing a hydrophilic aluminum surface by oxidizing nanoparticles and an aluminum substrate to form a hybrid nanostructure including nanoparticles on a part or the whole of the surface of the aluminum substrate and a plurality of nanoflakes around the nanoparticles.

The hybrid nanostructure in which nanoparticles and nanoflakes are hybridized on the surface of the aluminum substrate may be formed by the manufacturing method.

The oxidation in the preparing of the hydrophilic aluminum surface may be performed by bringing a reaction liquid including water or a vapor thereof into contact with the nanoparticles and the aluminum substrate. The water may be distilled water, deionized water, or a combination thereof, and the reaction liquid may be made of water, or made of an acid, a salt including Cl, and a combination thereof with water. As the salt including Cl, for example, sodium chloride (NaCl) may be applied.

The oxidation in the preparing of the hydrophilic aluminum surface may performed by contact with the reaction liquid at about 70° C. to about 150° C. or its vapor. The oxidation in the preparing of the hydrophilic aluminum surface may performed by contact with a reaction liquid at about 80° C. to about 130° C., a reaction liquid at about 90° C. to about 100° C., or its vapor. In addition, the oxidation may be performed, for example, for about 1 minute to about 100 minutes. In the range, the surface of the aluminum substrate may be rapidly oxidized to form a nanopattern in which a double nanostructure of nanoparticles and nanoflakes is hybridized on a part or the whole of the surface of the aluminum substrate, thereby manufacturing an aluminum surface with improved hydrophilicity.

The surface of the aluminum substrate becomes a state in which the surface is easily oxidized by a hot reaction liquid. The surface of the aluminum substrate forms a nanopattern in which needle-like nanoflakes are hybridized with the nanoparticles on the surface thereof by contact with the reaction liquid including water or its vapor. The oxidation reaction occurs when the aluminum surface comes into contact with water or water vapor included in the reaction liquid or the vapor thereof. The needle-like nanoflakes may be grown on the surface of the nanoparticles, and while the nanoflakes are grown in other areas, the nanopattern having a hybrid structure in which the plate-like nanoflakes are densely formed may be formed.

Figure 2:
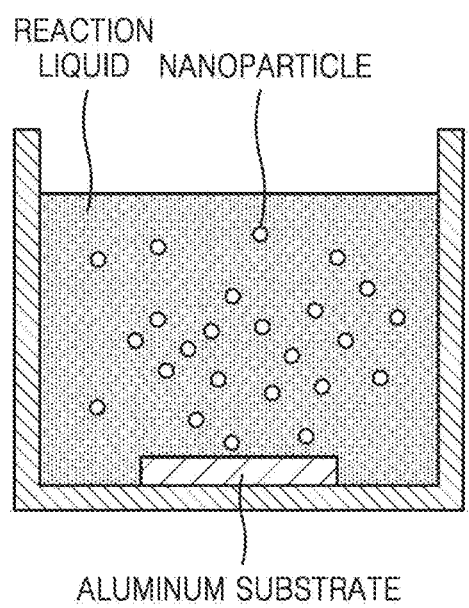
FIG. 2 is a schematic view for describing a manufacturing method of a hydrophilic aluminum surface body according to an embodiment.

According to one embodiment, as shown in FIG. 2, the hybrid nanostructure may be formed by contacting the nanoparticles and the aluminum substrate together in water and heating the reaction liquid to rapidly oxidize the reaction liquid. When the hybrid nanostructure is formed in the reaction liquid including water, aluminum oxide formed on the aluminum surface is attacked by bubbles present in the reaction liquid to promote the formation of the nanoflake structure.

The hydrophilic aluminum surface body manufactured by the manufacturing method may exhibit a hydrophilic property with a contact angle of 20° C. or less using purified water and may exhibit a superhydrophilic property with a contact angle of 10° C. or less.

According to the manufacturing method of the hydrophilic aluminum surface body, hydrophobic aluminum may be artificially prepared as hydrophilic or superhydrophilic aluminum without forming a coating film coated with a separate adduct such as a hydrophilic polymer or the like. The hydrophilic or superhydrophilic aluminum treated above has an improved dehumidification function and may be used for water harvesting, anti-fog, magnetic cleaning, anti-bacteria or growing cells. In addition, the hydrophilic aluminum treated by the manufacturing method hardly exhibits an aging effect, maintains a hydrophilic property for a long time, and may obtain a hydrophilic surface without using a hydrophilic coating agent. For example, an aluminum surface with a hybrid nanostructure including $TiO_2$ nanoparticles or Ag nanoparticles has hydrophilic persistence and an antimicrobial property. Furthermore, the method is a method that may be applied to large-area aluminum and may perform a large-scale oxidation process, and an eco-friendly method by minimizing the use of a toxic substance such as an acidic solution, thereby providing hydrophilic hybrid nanostructured aluminum.

Hereinafter, one or more embodiments will be described in more detail with reference to Examples.

The morphology structures of surfaces prepared in the following Examples and Comparative Examples were examined by a scanning electron microscope (SEM, FEI, Nova NanoSEM 200, USA). A contact angle (CA) for water was measured with a contact angle meter (Goniometer, Rame-Hart, USA). The volume of each droplet used at a static contact angle was 8 µl. The average CA values were measured at five different locations for the same sample.

Example 1

A plate material (thickness of 0.3 mm) having a purity of 99.9% was used as an aluminum substrate, and $TiO_2$ nanoparticles (average particle diameter of 30 nm) and the aluminum substrate were immersed in boiling water, maintained for 10 minutes and then removed from water to form an aluminum surface with a hybrid nanostructure.

Comparative Example 1

The aluminum substrate (pristine) used in Example 1 in a water-untreated state was regarded as Comparative Example 1.

Comparative Example 2

Instead of using $TiO_2$ nanoparticles, only the aluminum substrate used in Example 1 was immersed in boiling water, maintained for 10 minutes, and then removed from the water to prepare aluminum having a nanopatterned surface.

Evaluation Example 1: SEM Analysis and Evaluation of Water Contact Angle

Figure 3:
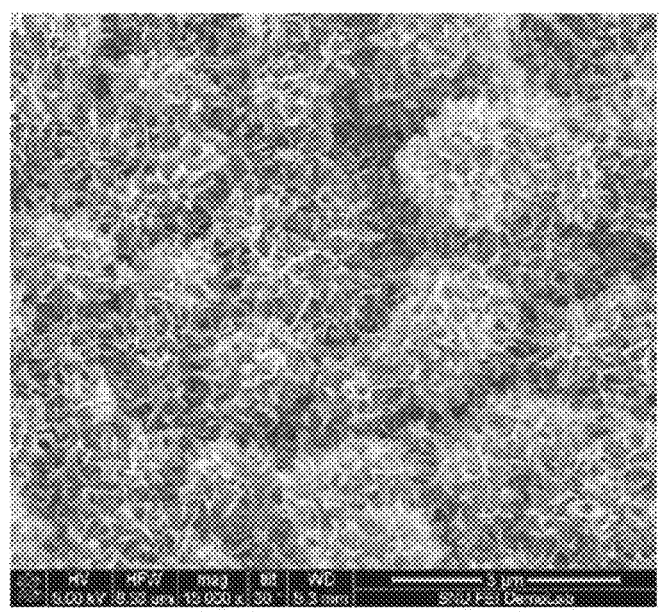
FIG. 3 is a scanning electron microscope (SEM) image showing a hybrid nanostructure formed on the aluminum surface according to Example 1.

A scanning electron microscope (SEM) was used to examine the morphology of the aluminum surface according to Example 1, and the results are shown in FIG. 1. As shown in FIG. 3, it was confirmed that the hybrid nanostructure formed on the aluminum surface had a structure in which plate-like nanoflakes were densely formed, and a structure having a size of about 1 to 3 micrometers was disposed below the nanoflakes. It may be confirmed that the plate-like nanoflake structure has a thickness of 10 nm to 300 nm.

Figure 4:
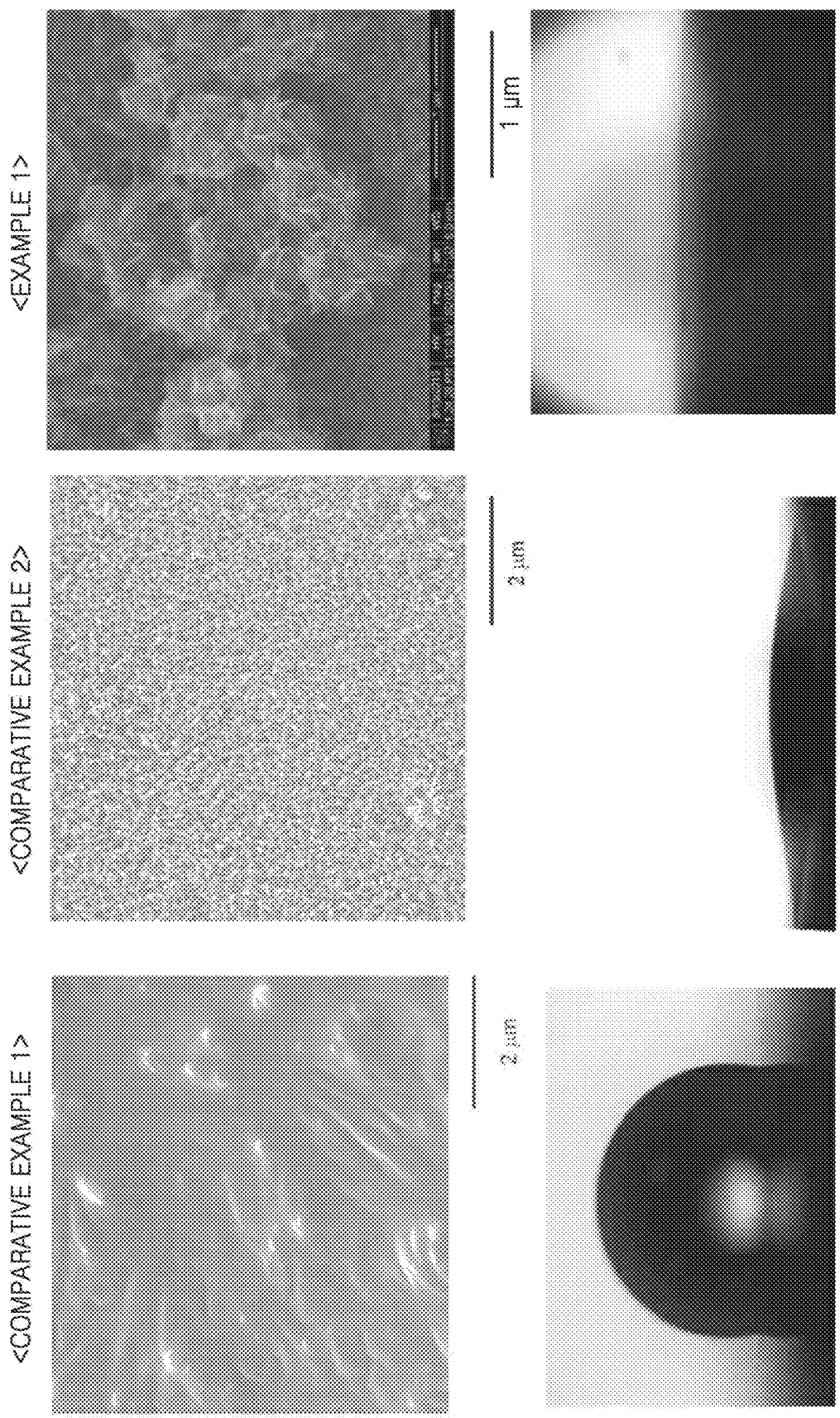
FIG. 4 is an SEM photograph of an aluminum surface and a contact angle image of purified water on each surface according to Comparative Examples 1 and 2 and Example 1, respectively.

For comparison with Comparative Examples 1 and 2, SEM photographs of aluminum surfaces according to Comparative Examples 1 and 2 and Example 1 and contact angle images of purified water on each surface are shown in FIG. 4. As shown in FIG. 4, Comparative Example 1 shows a general aluminum surface without surface treatment and Comparative Example 2 shows only a nanoflake structure formed on an aluminum surface, whereas Example 1 shows that nanoflakes are formed on a microstructure in the case of a hybrid nanostructure formed on the aluminum surface.

In contact angle images of purified water at the lower portion of FIG. 4, it was shown that the aluminum surface of Comparative Example 1 had a contact angle close to 100°, the aluminum surface of Comparative Example 2 had a contact angle of about 10°, while the aluminum surface of Example 1 had a very low value enough not to measure the contact angle.

Evaluation Example 2: SEM Image According to Water Treatment Time

Figure 5:
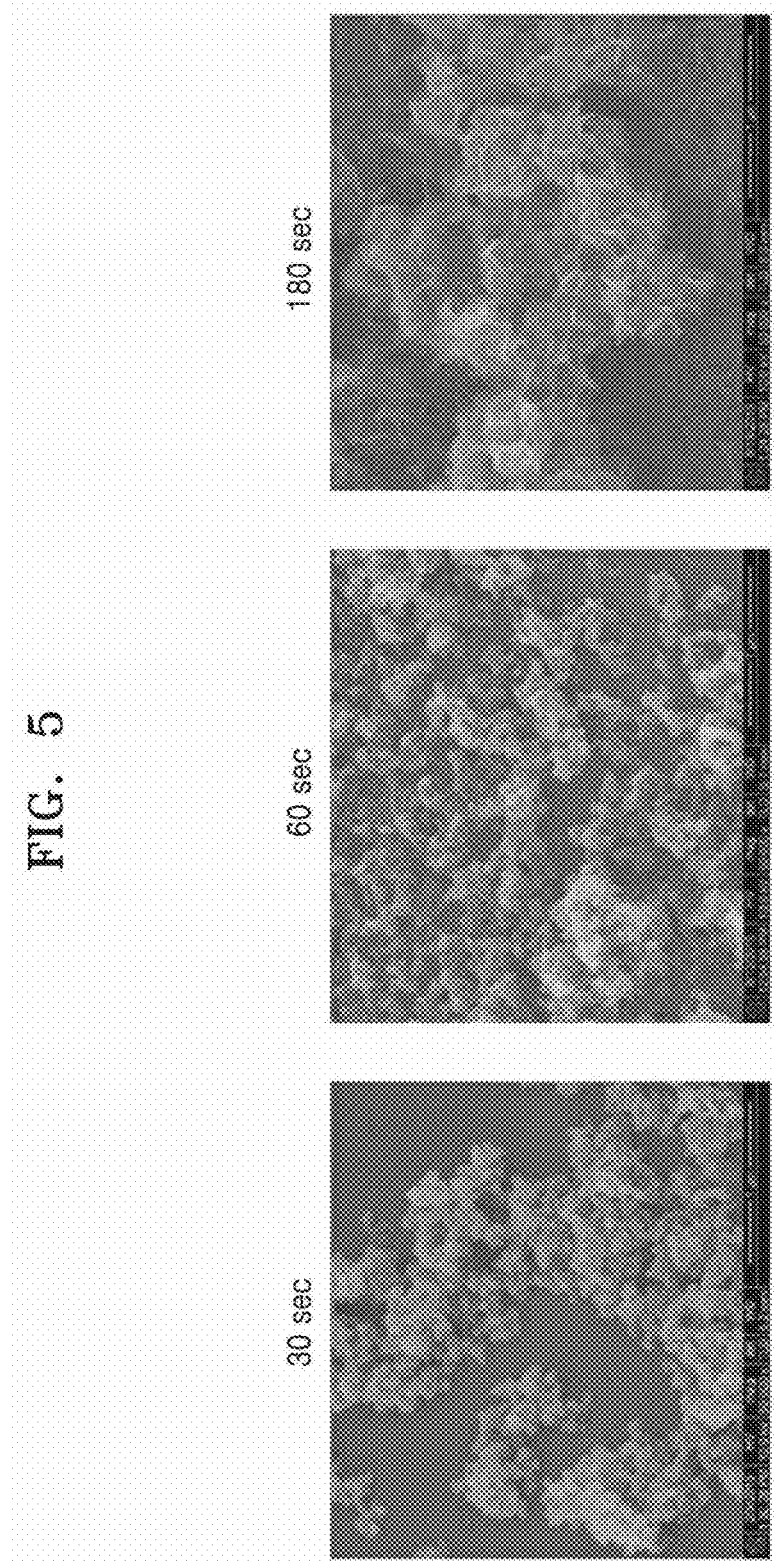
FIG. 5 is an SEM image of a surface of aluminum with a hybrid nanostructure according to an oxidation treatment time.

FIG. 5 is an SEM image of a surface of aluminum with a hybrid nanostructure according to an adding time in boiling water. As the time increases from 30 seconds to 180 seconds, it may be seen that the hybrid nanostructure is much clearly realized by further developing the flake having the nanoflake structure.

Evaluation Example 3: TEM Analysis

Figure 6:
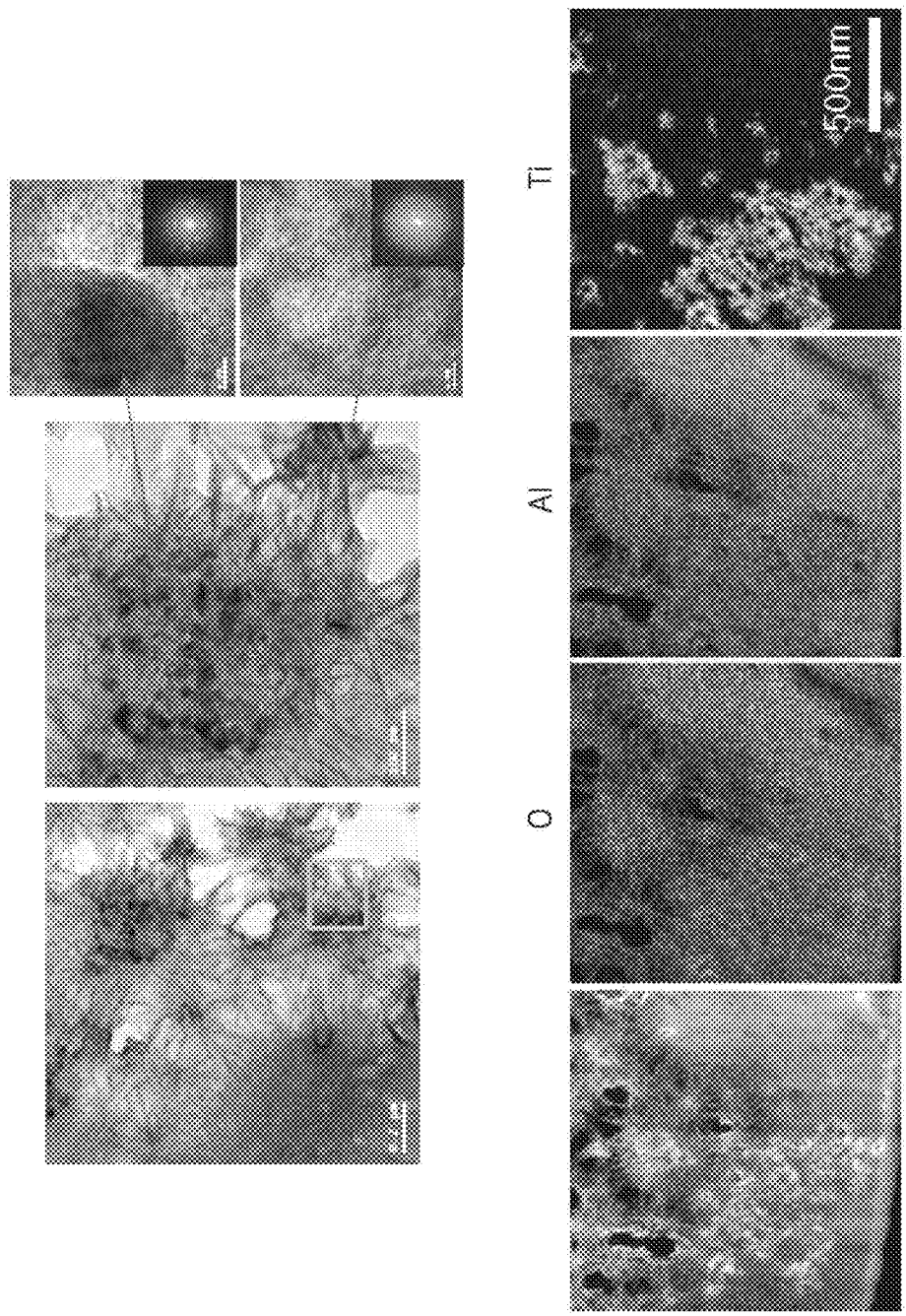
FIG. 6 is an internal cross-sectional image of a hybrid nanostructure of the aluminum surface and a photograph analyzing a chemical composition forming an internal cross-section according to Example 1.

FIG. 6 is a result of a TEM analysis of a hybrid nanostructure on an aluminum surface according to Example 1, and it may be seen that $TiO_2$ was present in the form of one nanoparticle or several clusters of nanoparticles and a nanoflake structure was formed around the nanoparticles. As a result of the TEM component analysis, it may be seen that the nanoparticles are $TiO_2$ nanoparticles and each of the nanoflakes has an AlOOH structure. It may be seen that the AlOOH structure is similar to a boehmite structure, which is an aluminum oxide substance reported in the existing literature. [Kloprogge, Journal of colloid and interface science 296 (2006) 572-576]

Evaluation Example 4: Change in Water Contact Angle with Time

Figure 7:
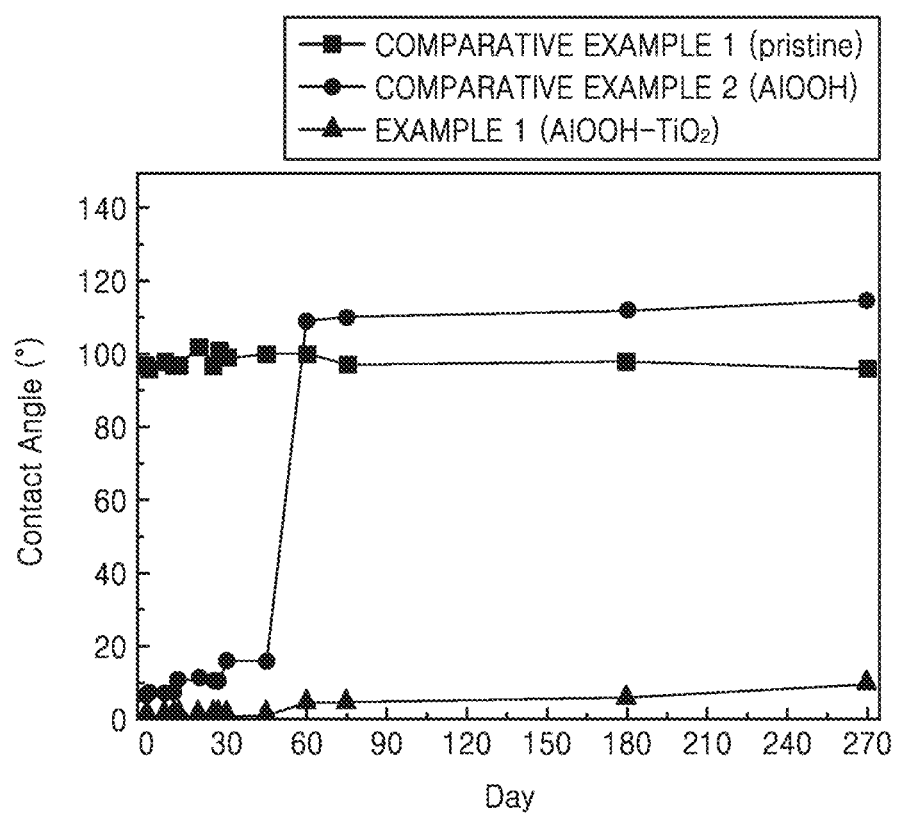
FIG. 7 is a result obtained by measuring changes in contact angle for purified water over time on the surface of aluminum according to Comparative Examples 1 and 2 and Example 1.

FIG. 7 is a result of measuring changes in contact angle for purified water over time on the surface of aluminum according to Comparative Examples 1 and 2 and Example 1, and the result is shown in FIG. 7.

As shown in FIG. 7, the water contact angle on the surface of general aluminum of Comparative Example 1 was not changed continuously around 100°. On the aluminum surface with only AlOOH nanoflakes without $TiO_2$ nanoparticles in Comparative Example 2, the contact angle with purified water at the initial stage was less than 10°, but had still hydrophilicity to about 18° after 45 days. However, it may be seen that the oxidation progresses near 60 days and the change of the contact angle is higher than 100°, and the hydrophilic property is not maintained any more. However, the water contact angle at the aluminum surface on which the hybrid nanostructure including the $TiO_2$ nanoparticles of Example 1 is formed is maintained at approximately 0° in the early stage and maintained at about 5° after 60 days, and hydrophilicity is maintained well at about 9° even after 270 days. It may be expected that the structural part of the hybrid nanostructure acts.

Examples 2 to 5

In the present Examples, in order to develop an oil-water separation filter excellent in mechanical durability using an aluminum surface with the hybrid nanostructure, a water treatment method was used.

In Examples 2 to 5, aluminum meshes with purity of 99.9% were used as aluminum substrates. The aluminum substrates used in Examples 2 to 5 were represented by Al #1 (a diameter of about 50 μm and a hole size of about 7,600 μm2), Al #2 (a diameter of about 90 μm and a hole size of about 16,000 μm2), Al #3 (a diameter of about 230 μm and a hole size of about 90,000 μm2), and Al #4 (a diameter of about 250 μm and a hole size of about 164,000 μm2) depending on a mesh size, respectively.

$TiO_2$ nanoparticles (an average particle diameter of 30 nm) and the aluminum mesh was immersed in boiling water, maintained for 10 minutes, and then removed from the water to form a hybrid nanostructure on the surface of the aluminum mesh. The aluminum meshes formed with the hybrid nanostructures in Examples 2 to 5 may be represented by water and $TiO_2$ treated Al #1, Al #2, Al #3, and Al #4.

Comparative Examples 3 to 6

Aluminum meshes (pristine Al #1, Al #2, Al #3, and Al #4) in the water-untreated state used in Examples 2 to 5 were regarded as Comparative Examples 3 to 6, respectively.

Comparative Examples 7 to 10

Instead of using $TiO_2$ nanoparticles, the aluminum meshes used in Examples 2 to 5 were immersed in boiling water, maintained for 10 minutes, and then removed from water to prepare aluminum meshes (water treated Al #1, Al #2, Al #3, and Al #4) having surfaces with nanopatterns and the prepared aluminum meshes were regarded as Comparative Examples 7 to 10.

Evaluation Example 5: SEM Analysis and Evaluation of Water Contact Angle

Figure 8:
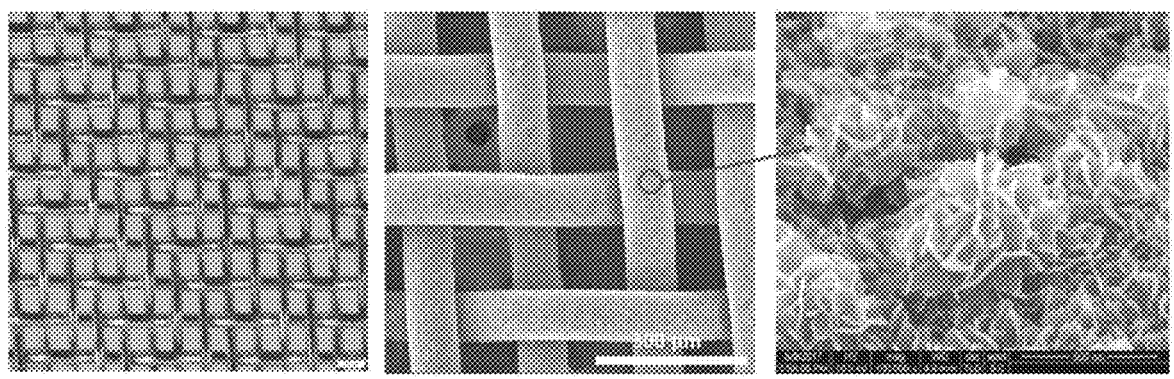
FIG. 8 is an SEM photograph observed after forming a hybrid nanostructure on an aluminum mesh in Example 2.

FIG. 8 shows an SEM photograph observed after forming a hybrid nanostructure on an aluminum mesh in Example 2. As shown in FIG. 8, it may be seen that the hybrid nanostructure is uniformly formed on the aluminum mesh surface.

The water contact angle of the aluminum mesh according to Example 2 was measured, and as a result, it was confirmed that the contact angle was less than about 5°.

Evaluation Example 6: Oil-Water Separation Experiment

An experiment for separating crude oil from water was performed by applying aluminum meshes according to Comparative Examples 3 and 7 and Example 2, the oil was separated and removed from water, and then the aluminum mesh surface was washed with water, and thereafter, the aluminum mesh surface was analyzed by an optical microscope and an electron microscope.

Figure 9A:
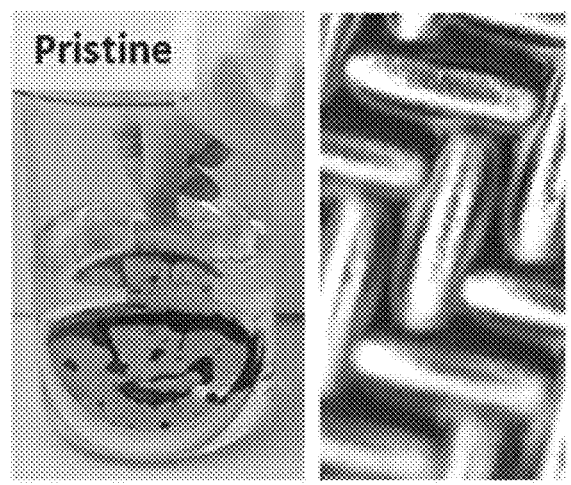
FIGS. 9A to 9C are oil-water separation experiment scenes and optical microscope images of mesh surfaces after the oil-water separation experiment using aluminum meshes according to Comparative Examples 3 and 7 and Example 2, respectively.
Figure 9B:
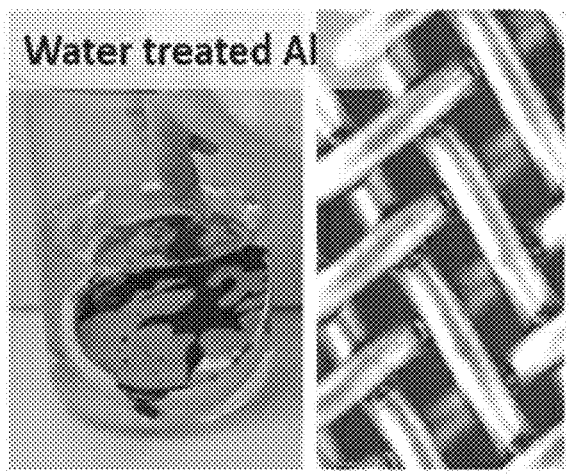
Figure 9C:
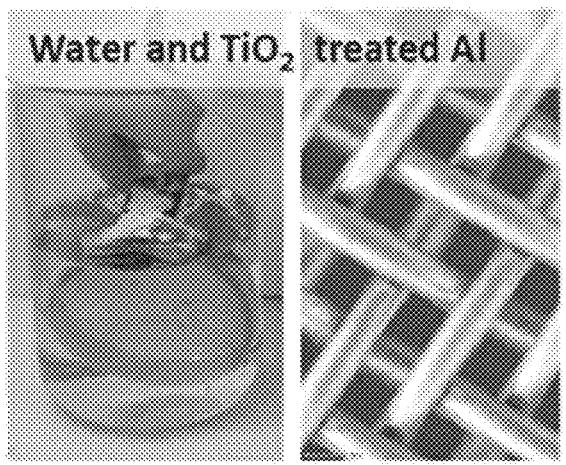

FIGS. 9A to 9C are oil-water separation experiment scenes and optical microscope images of mesh surfaces after the oil-water separation experiment using aluminum meshes according to Comparative Examples 3 and 7 and Example 2, respectively.

As shown in FIGS. 9A to 9C, in the case of the water-untreated aluminum mesh of Comparative Example 3, the crude oil blocked the holes of the mesh, and the oil and the sample were not easily separated from each other during the water washing.

The aluminum mesh according to Comparative Example 7 had more oil-water separation performance than water treatment, but it was confirmed that the separation rate of the oil and the sample was slow during water washing, and oil residues covered the nanostructures on the surface when observed by an electron microscope. Therefore, it is expected that the aluminum mesh according to Comparative Example 7 will have difficulty in maintaining hydrophilicity and reuse.

The aluminum mesh according to Example 2, in which the hybrid nanostructure was formed on the surface, was excellent in separability of the oil and the sample during washing, and it was difficult to find the oil except for a part where the meshes overlapped with each other on the optical micrographs. In addition, even with an electron microscope, the oil does not cover the nanostructure, so its shape was confirmed and its reusability was confirmed.

Evaluation Example 7: Measurement of Oil Permeation Pressure

Figure 10:
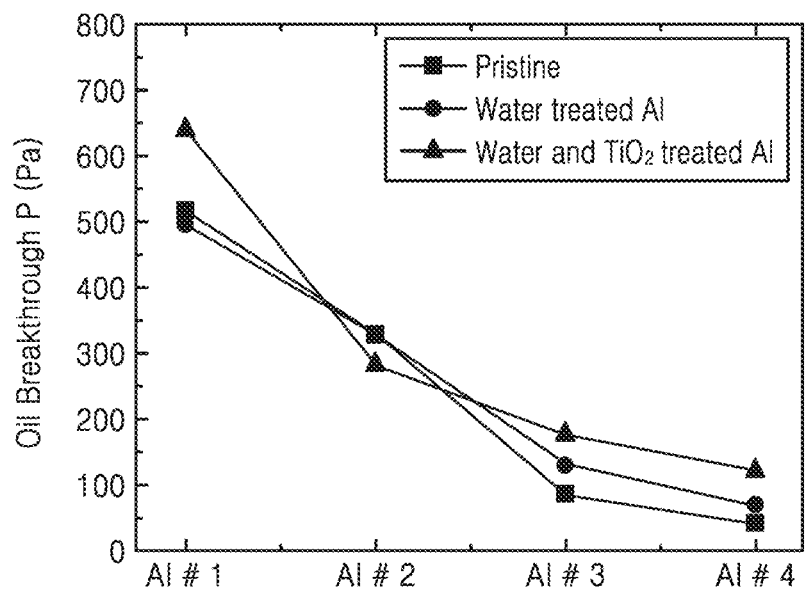
FIG. 10 is a result obtained by measuring oil permeation pressure for aluminum meshes according to Comparative Examples 3 to 6 (pristine Al #1, Al #2, Al #3, and Al #4), Comparative Examples 7 to 10 (water treated Al #1, Al #2, Al #3, and Al #4) and Examples 2 to 5 (water and $TiO_2$ treated Al #1, Al #2, Al #3, and Al #4)

In order to compare a size of an aluminum mesh and oil treatment pressure according to treatment, FIG. 10 shows a result obtained by measuring oil permeation pressure for aluminum meshes according to Comparative Examples 3 to 6 (pristine Al #1, Al #2, Al #3, and Al #4), Comparative Examples 7 to 10 (water treated Al #1, Al #2, Al #3, and Al #4) and Examples 2 to 5 (water and $TiO_2$ treated Al #1, Al #2, Al #3, and Al #4).

As shown in FIG. 10, it may be seen that the oil permeation pressure is inversely proportional to the increase of the mesh hole. It may be seen that the oil permeation pressure may be inversely proportional even after the water treatment and the durability for the oil pressure is maintained. It may be seen that the water treatment method also follows the tendency to be inversely proportional as such.

Evaluation Example 8: Measurement of Water Contact Angle

Figure 11:
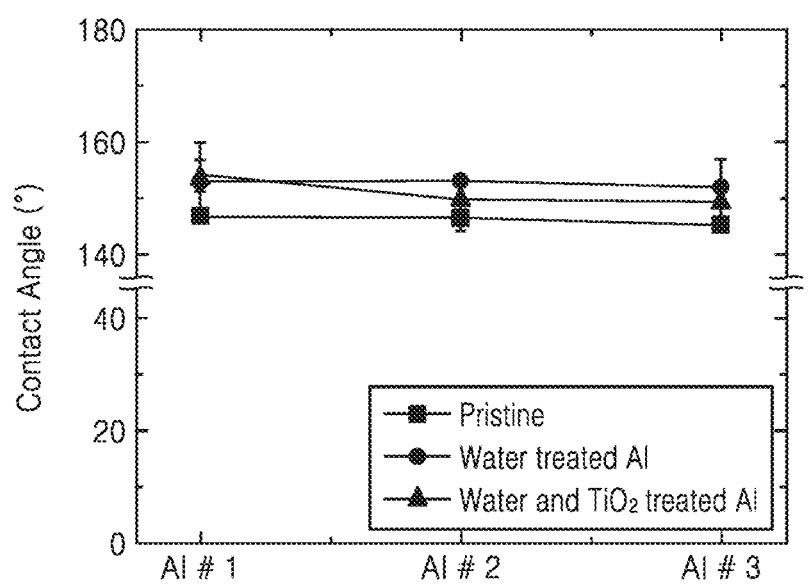
FIG. 11 is a result obtained by measuring water contact angles for crude oil of aluminum meshes according to Comparative Examples 3 to 5 (pristine Al #1, Al #2, and Al #3), Comparative Examples 7 to 9 (water treated Al #1, Al #2, and Al #3), and Examples 2 to 4 (water and $TiO_2$ treated Al #1, Al #2, and Al #3)

In order to confirm hydrophilicity and underwater oleophobicity of aluminum meshes according to Comparative Examples 3 to 5 (pristine Al #1, Al #2, and Al #3), Comparative Examples 7 to 9 (water treated Al #1, Al #2, and Al #3) and Examples 2 to 4 (water and $TiO_2$ treated Al #1, Al #2, and Al #3), a water contact angle for crude oil was measured and analyzed, and the result thereof was shown in FIG. 11.

As shown in FIG. 11, it was confirmed that an untreated aluminum mesh had a lower water oil contact angle than a surface with only nanoflakes, and the aluminum mesh formed with a hybrid nanostructure permeated with $TiO_2$ had a high water oil contact angle regardless of the mesh size.

Figure 12:
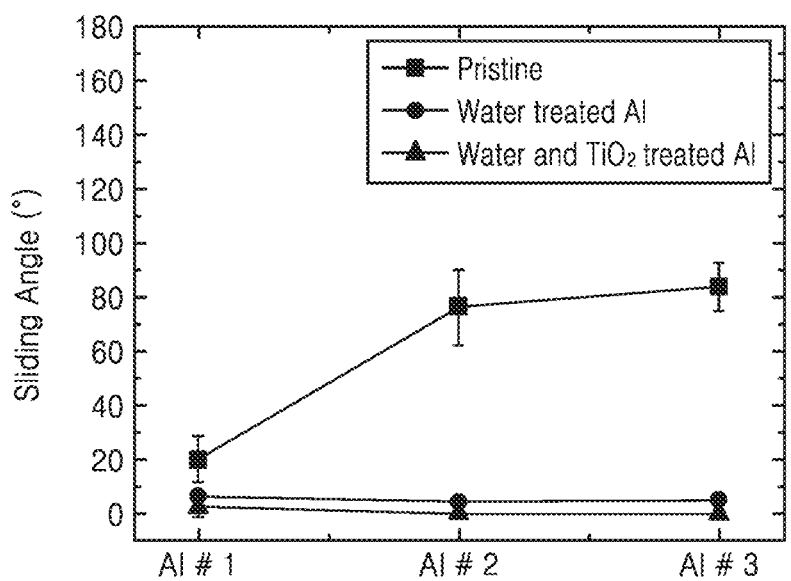
FIG. 12 is a result obtained by measuring water sliding angles of aluminum meshes according to Comparative Examples 3 to 5 (pristine Al #1, Al #2, and Al #3), Comparative Examples 7 to 9 (water treated Al #1, Al #2, and Al #3), and Examples 2 to 4 (water and $TiO_2$ treated Al #1, Al #2, and Al #3)

In addition, a result of measuring water sliding angles of aluminum meshes according to Comparative Examples 3 to 5 (pristine), Comparative Examples 7 to 9 (water treated Al) and Examples 2 to 4 (water and $TiO_2$ treated Al) was shown in FIG. 12. As shown in FIG. 12, the aluminum mesh water-treated with $TiO_2$ had a good oleophobicity unlike other Comparative Examples, were rolled well enough to make measurement difficult, and had a high contact angle.

Figure 13:
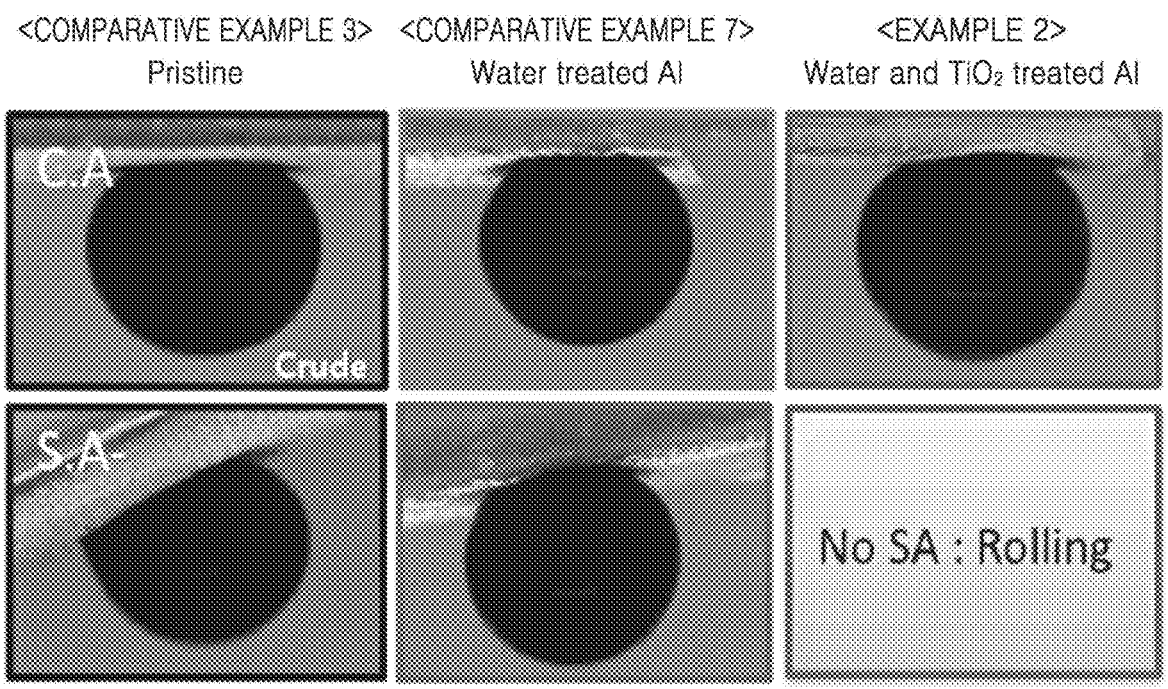
FIG. 13 is an SEM image of water contact angles and water sliding angles of aluminum meshes according to Comparative Example 3, Comparative Example 7, and Example 2.

SEM images of water contact angles and water sliding angles of aluminum meshes according to Comparative Example 3, Comparative Example 7, and Example 2 are shown in FIG. 13.

Example 6

A plate material (thickness of 0.3 mm) having purity of 99.9% was used as an aluminum substrate, and Pt nanoparticles (average particle diameter of 30 nm) and the aluminum substrate were immersed in boiling water, maintained for 10 minutes and then removed from water to form an aluminum surface with a hybrid nanostructure.

Evaluation Example 9: SEM Analysis

Figure 14:
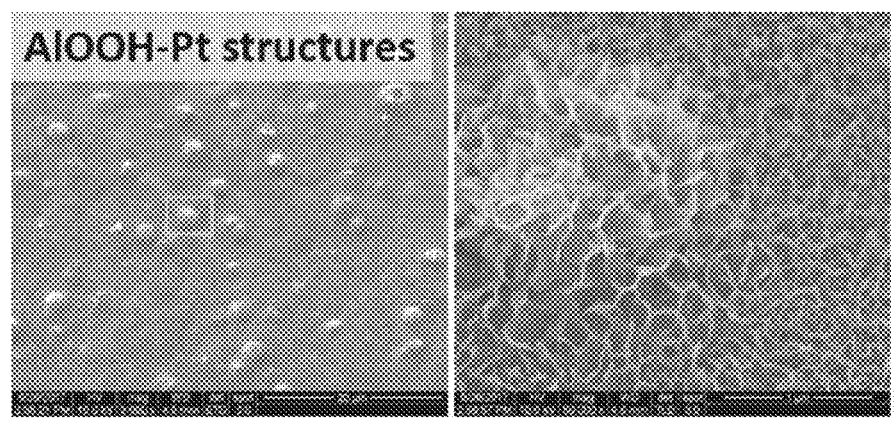
FIG. 14 is an SEM image showing a hybrid nanostructure formed on an aluminum surface according to Example 6.

An SEM was used to confirm the morphology of a hybrid nanostructure formed on the aluminum surface according to Example 6, and the results are shown in FIG. 14.

As shown in FIG. 14, even when an aluminum material and Pt nanoparticles are added together in boiling water and oxidized, it may be confirmed that a hybrid nanostructure in which plate-like nanoflake structures are densely formed around the Pt nanoparticles is formed on the aluminum surface. The plate-like nanoflake structure was confirmed to be AlOOH as a component analysis result.

As described above, according to one or more embodiments, the hydrophilic aluminum surface body is excellent in hydrophilicity, does almost not exhibit an aging effect, and may maintain hydrophilicity for a long time. According to the manufacturing method of the hydrophilic aluminum surface body, it is possible to prepare hydrophobic aluminum artificially as hydrophilic or superhydrophilic aluminum due to a small contact angle, and to provide an aluminum surface body which does almost not exhibit an aging effect and maintains hydrophilicity for a long time. In addition, it is possible to impart excellent hydrophilicity to the aluminum surface without using a hydrophilic coating agent. The manufacturing method is a method which may be applied to large-area aluminum and may be processed under low vacuum or atmospheric pressure to make a mass production, and an eco-friendly method by minimizing the use of toxic substances such as an acidic solution.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A hydrophilic aluminum surface body comprising:
an aluminum substrate; and
a nanopattern including a hybrid nanostructure formed directly or indirectly on a surface of the aluminum substrate,
wherein the hybrid nanostructure includes nanoparticles and a plurality of nanoflakes around the nanoparticles,
wherein each of the nanoparticles include at least one selected from the group consisting of metals, metal oxides, carbon nanotubes, and graphene, and
wherein the metals include at least one selected from the group consisting of Ti, Au, Ag, Pt, Cr, Fe, Co, Ni, Cu, Si, and alloys thereof, and the metal oxides are oxides of the metals except for boehmite (AlO(OH)), aluminum oxide (Al2O3), or a combination thereof.

2. The hydrophilic aluminum surface body of claim 1, wherein each of the nanoflakes has a plate shape, a needle shape, or a combined shape thereof, and the nanoflakes are formed around the nanoparticles and on the aluminum substrate and grown in an upper direction of the surface of the aluminum substrate.

3. The hydrophilic aluminum surface body of claim 1, wherein each of the nanoflakes has a height of 10 nm to 300 nm.

4. The hydrophilic aluminum surface body of claim 1, wherein each of the nanoflakes includes boehmite (AlO(OH)), aluminum oxide ($Al_2O_3$), or a combination thereof.

5. The hydrophilic aluminum surface body of claim 1, wherein a plurality of nanoparticles are aggregated to form a nanocluster.

6. The hydrophilic aluminum surface body of claim 1, wherein an average diameter of the nanoparticles is about 1 nm to about 1000 nm.

7. The hydrophilic aluminum surface body of claim 1, wherein the aluminum substrate has a plate or mesh shape.

8. The hydrophilic aluminum surface body of claim 1, further comprising:
an aluminum oxide film including boehmite (AlO(OH)), aluminum oxide ($Al_2O_3$), or a combination thereof between the nanopattern and the surface of the aluminum substrate.

9. The hydrophilic aluminum surface body of claim 1, wherein the aluminum surface body has a contact angle of 10° or less using purified water.

10. An oil-water separation apparatus comprising the hydrophilic aluminum surface body of claim 1.

11. A manufacturing method of the hydrophilic aluminum surface body of claim 1, the method comprising:
preparing a hydrophilic aluminum surface by oxidizing nanoparticles and an aluminum substrate to form a hybrid nanostructure including nanoparticles on a part or the whole of the surface of the aluminum substrate and a plurality of nanoflakes around the nanoparticles.

12. The manufacturing method of claim 11, wherein oxidation in the preparing of the hydrophilic aluminum surface is performed by bringing a reaction liquid including water or a vapor thereof into contact with the nanoparticles and the aluminum substrate.

13. The manufacturing method of claim 11, wherein oxidation in the preparing of the hydrophilic aluminum surface is performed by bringing a reaction liquid including water at about 70° C. to about 150° C. or a vapor thereof into contact with the nanoparticles and the aluminum substrate.

14. The manufacturing method of claim 11, wherein oxidation in the preparing of the hydrophilic aluminum surface is performed for about 1 minute to 100 minutes.

15. The manufacturing method of claim 11, wherein each of the nanoparticles includes at least one selected from the group consisting of metals, metal oxides, carbon nanotubes, and graphene.

16. The manufacturing method of claim 11, wherein each of the nanoparticles include at least one selected from the group consisting of Ti, Au, Ag, Pt, Cr, Fe, Co, Ni, Cu, Al, Si, alloys thereof and oxides thereof.

17. The manufacturing method of claim 11, wherein each of the nanoflakes has a plate shape, a needle shape, or a combined shape thereof, and the nanoflakes are formed around the nanoparticles and on the aluminum substrate and grown in an upper direction of a surface of the aluminum substrate to form a hybrid nanostructure.

18. The manufacturing method of claim 11, wherein each of the nanoflakes includes boehmite (AlO(OH)), aluminum oxide ($Al_2O_3$), or a combination thereof.

* * * * *